United States Patent
Langeslag et al.

(10) Patent No.: US 9,036,375 B2
(45) Date of Patent: May 19, 2015

(54) CONTROLLER THAT DETERMINES AVERAGE OUTPUT CURRENT OF A SWITCHING CIRCUIT

(75) Inventors: Wilhelmus Hinderikus Maria Langeslag, Wijchen (NL); Hans Halberstadt, Groesbeek (NL); Jeroen Kleinpenning, Lent (NL)

(73) Assignee: NXP B.V., Eindhoven (NL)

( * ) Notice: Subject to any disclaimer, the term of this patent is extended or adjusted under 35 U.S.C. 154(b) by 417 days.

(21) Appl. No.: 13/449,903

(22) Filed: Apr. 18, 2012

(65) Prior Publication Data

US 2013/0100711 A1    Apr. 25, 2013

(30) Foreign Application Priority Data

Apr. 20, 2011 (EP) ..................................... 11250488

(51) Int. Cl.
*H02M 3/335* (2006.01)
*H02M 1/00* (2006.01)

(52) U.S. Cl.
CPC .. *H02M 3/33523* (2013.01); *H02M 2001/0025* (2013.01); *H02M 3/33507* (2013.01); *H02M 2001/0009* (2013.01)

(58) Field of Classification Search
CPC ................. H02M 2001/0025; H02M 3/33507; H02M 3/33515; H02M 3/33523
USPC ................. 323/285; 363/21.01, 21.08, 21.12, 363/21.16
See application file for complete search history.

(56) References Cited

U.S. PATENT DOCUMENTS

| | | | |
|---|---|---|---|
| 4,739,462 A * | 4/1988 | Farnsworth et al. | ....... 363/21.16 |
| 6,972,969 B1 | 12/2005 | Shteynberg et al. | |
| 7,259,972 B2 | 8/2007 | Yang | |
| 7,505,287 B1 | 3/2009 | Kesterson | |

(Continued)

FOREIGN PATENT DOCUMENTS

| | | |
|---|---|---|
| EP | 1 405 397 B1 | 4/2004 |
| GB | 2 438 464 A | 11/2007 |

(Continued)

OTHER PUBLICATIONS

Philips Semiconductors, "TEA1401T Power Plug for the Universal Mains", datasheet, 20 pgs. (Mar. 1997).

(Continued)

*Primary Examiner* — Fred E Finch, III

(57) ABSTRACT

A switching circuit (400) comprising an inductive component (406) including at least one winding; and a switch (404) is configured to transfer power from a voltage source (402) to the inductive component (406) in accordance with a switch control signal (412). The switching circuit (400) also comprises a controller (408) configured to integrate the voltage across the inductive component (406) in order to generate a signal representative of magnetic flux in the inductive component (406); and use the signal representative of the magnetic flux in the inductive component to account for a peak magnetization current value in order to control the switch (404).

6 Claims, 10 Drawing Sheets

(56) References Cited

U.S. PATENT DOCUMENTS

| | | |
|---|---|---|
| 2004/0264216 A1* | 12/2004 | Mednik et al. .................. 363/18 |
| 2005/0073862 A1 | 4/2005 | Mednik et al. |
| 2006/0077697 A1 | 4/2006 | Yang |
| 2006/0158909 A1 | 7/2006 | Hawley |
| 2007/0108955 A1 | 5/2007 | Currell |
| 2007/0121349 A1 | 5/2007 | Mednik et al. |
| 2007/0274107 A1* | 11/2007 | Garner et al. ............. 363/21.12 |
| 2008/0259650 A1 | 10/2008 | Huynh et al. |
| 2009/0237960 A1* | 9/2009 | Coulson et al. ............ 363/21.12 |
| 2010/0073966 A1* | 3/2010 | Mayell ........................... 363/20 |

FOREIGN PATENT DOCUMENTS

| | | |
|---|---|---|
| WO | 2008/104919 A1 | 9/2008 |
| WO | 2010/015999 A1 | 2/2010 |

OTHER PUBLICATIONS

Philips Semiconductors, "TEA1507 GreenChip II SMPS Control IC", datasheet, 20 pgs. (Dec. 2000).

Extended European Search Report for European patent appln. No. 11250488.1 (Jan. 12, 2012)xx.

\* cited by examiner

CONTROLLER THAT DETERMINES AVERAGE OUTPUT CURRENT OF A SWITCHING CIRCUIT

CROSS-REFERENCE TO RELATED APPLICATIONS

This application claims the priority under 35 U.S.C. §119 of European patent application no. 11250488.1, filed on Apr. 20, 2011, the contents of which are incorporated by reference herein.

The present disclosure relates to the field of switching circuits and methods of operating switching circuits, and particularly, although not exclusively, switching circuits that have a controller that is configured to determine an average output current of the switching circuit.

In known switched mode power supplies (SMPS) with mains isolation and control at the primary side, it can be necessary to sense the output variable that is to be regulated, for example, output voltage or output current. The sensed output variable can then be used to regulate the SMPS so that the output is at the desired level. It is known to sense the output variable, compare it with a reference value at the secondary side, and send an error signal representative of the comparison to the primary side for regulation.

EP 1405397 (Koninklijke Philips Electronics N.V.) discloses a current controlled switched mode power supply wherein the line voltage and primary current are emulated by means of an auxiliary winding on the primary side. Current flowing in a resistor (R1) is buffered by means of first and second current mirrors to provide a voltage varying over time at an input of a pulse width modulator. This voltage is utilized to provide current mode controlled operation of the switch mode power supply.

The listing or discussion of a prior-published document or any background in the specification should not necessarily be taken as an acknowledgement that the document or background is part of the state of the art or is common general knowledge.

According to a first aspect of the invention, there is provided a switching circuit comprising:
an inductive component including at least one winding;
a switch configured to transfer power from a voltage source to the inductive component in accordance with a switch control signal; and
a controller, configured to:
   integrate the voltage across the inductive component in order to generate a signal representative of magnetic flux in the inductive component; and
   use the signal representative of the magnetic flux in the inductive component to account for a peak magnetization current value in order to control the switch.

The magnetic flux in the inductive component may also be referred to as "magnetizing current", and can be then the sum of all currents in the windings scaled by the turns ratios.

Integrating the voltage across the inductive component in order to generate a signal representative of the magnetic flux in the inductive component may be referred to as providing an emulated signal. Using this emulated signal enables a more accurate value for the peak magnetization current to be determined and therefore more accurate switching circuit may be provided. The switching circuit may be more accurate as more accurate feedback representative of the output of the circuit can be obtained, and therefore more accurate control of the circuit can be provided.

The controller may be configured to control the switch in order to provide a constant average output current in some examples.

In contrast to the prior art, at least some of the errors that would be introduced when determining the peak magnetization current from signals at a primary side of a flyback converter (for example) can be reduced.

In some embodiments, the switch may be coupled between a voltage source and the inductive component.

The controller may be configured to use the signal representative of the magnetic flux in the inductive component to compensate for errors caused by propagation delay and/or resonance in the switching circuit. Resonance may also be referred to as drain rise time in some embodiments, and can mean a maximum rise time of $\frac{1}{4} \times 2 \times \pi \times \sqrt{(LC)}$. In some or most examples, the rise time is determined by the current through the drain of the switch at switching-off, the total capacitance on the drain node and the input voltage. Such errors may be introduced by the prior art when determining the peak magnetization current from signals at a primary side of a flyback converter (for example).

The switch may be a FET, or any other transistor. In examples where the switch is a FET, it has a voltage at the source of the FET (Vsource), which can be measured by including a sense resistor at the source of the FET, and a desired value of the voltage at the source of the FET (Vsource, setpoint). The controller may be further configured to record the value of the signal representative of the flux in the inductive component when the FET is switched off (S1) as a first value (A); and record the value of the signal representative of the flux in the inductive component at the start of the secondary stroke (S2) at the peak level of the flux as a second value (B). The controller may be further configured to use the first value (A) and second value (B) to determine the ratio between the values of the signal representative of a flux in the inductive component at S1 and S2; and use the determined ratio to adjust Vsource or Vsource, setpoint in order to account for the peak magnetization current when controlling the switch.

In this way, the degree to which the magnetization current continues to increase after the FET is closed (that is, the signal at the gate of the FET goes low) can be determined, and recorded as the "determined ratio". The determined ratio can then be used to offset a comparison between Vsource and Vsource, setpoint such that the average output current can be controlled more accurately.

In some examples a senseFET or current mirror may be used for monitoring the current through the switch.

The controller may be configured to multiply the value of Vsource, setpoint by first value/second value (A/B) to provide a corrected Vsource, setpoint signal, and compare the corrected Vsource, setpoint signal with Vsource in order to identify when the switch is to be operated. According to this example, the first and/or second values can be recorded from a previous cycle of operation of the switching circuit so that the switching circuit can be operated without having to wait for the second value to be recorded for a current cycle.

The controller may be configured to multiply a value of Vsource at S1 by second value/first value to determine the peak magnetization current.

The controller may be further configured to:
multiply the signal representative of the magnetic flux in the inductive component by a scaling factor (D) in order to provide a modified signal representative of the peak magnetization current; and
adjust the scaling factor (D) such that the value of the modified signal representative of the flux in the inductive component tends towards the value of the current through the switch during the primary stroke; and determine the peak magnetization current value by measuring the modified signal representative of the flux in the inductive component at the start of a secondary stroke of the switching circuit.

A primary stroke of the switching circuit can be considered as the period of time between the instant that the switch is closed and the instant of maximum magnetization current in the inductor. A secondary stroke can be considered as the period of time that magnetic energy is flowing to the output up until the current in the inductive component crosses zero. In an alternative embodiment, the primary stroke may be considered as the period of time between the instant that the switch is closed and the time at which the switch is turned off.

The controller may comprise an integrator configured to process the modified signal representative of the flux in the inductive component with a signal representative of the current through the switch in order to adjust the scaling factor (D). This may be performed in the analogue or digital domain.

The controller may comprise one or more switches that are configured to disconnect the modified signal representative of the magnetic flux in the inductive component and/or the signal representative of the current through the switch from the integrator such that the scaling factor (D) is not updated in accordance with signals that are not obtained during the primary stroke.

The controller may comprise a comparator configured to compare the signal representative of magnetic flux in the inductive component with the current through the switch during the primary stroke. The controller may comprise an up/down counter that is configured to increase or decrease the scaling factor (D) in accordance with an output of the comparator. The up/down counter may be configured not to adjust the scaling factor (D) if the output of the comparator is considered to represent an acceptable comparison between the modified signal representative of the magnetic flux in the inductive component and the signal representative of the current through the switch. The comparator output may be processed at a specific moment in time related to a logic state of the system.

In other examples, the controller may comprise a window comparator that is configured to increase or decrease the scaling factor (D) if the scaling factor (D) is outside a window. It will be appreciated by the skilled person that other implementations are possible. For example, a digital implementation can be used to adapt the scaling factor (D) in relation to measurements of the real current and emulated signal.

The controller may be further configured to determine the average output current using the peak magnetization current value. The average output current can be used in controlling the switch of the switching circuit.

The circuit may comprise an auxiliary winding coupled to the inductive component. The auxiliary winding may be configured to provide the controller with a signal representative of the voltage across the inductive component.

The inductive component may be a transformer, and the controller may be configured to integrate the voltage across the magnetizing inductance of the transformer in order to generate the signal representative of the magnetization current in the transformer.

There may be provided a switching circuit comprising:
an inductive component including at least one winding; and
a switch configured to transfer power from a voltage source to the inductive component in accordance with a switch control signal; and
a controller, configured to:
integrate the voltage across the inductive component in order to generate a signal representative of a magnetization current in the inductive component;
record the value of the signal representative of the magnetizing in the inductive component when the switch is switched off (S1) as a first value (A);
record the value of the signal representative of the magnetizing current in the inductive component at the start of the secondary stroke (S2) as a second value (B);
use the first value (A) and second value (B) to determine the ratio between the values of the signal representative of the magnetizing current in the inductive component at S1 and S2; and
use the determined ratio to adjust the Vsource or Vsource, setpoint in order to account for the peak magnetization current when controlling the switch.

There may be provided a switching circuit comprising:
an inductive component including at least one winding; and
a switch wherein the switch is configured to transfer power from a voltage source to the inductive component in accordance with a switch control signal; and
a controller, configured to:
integrate the voltage across the inductive component in order to generate a signal representative of a magnetization current in the inductive component;
multiply the signal representative of the magnetizing current in the inductive component by a scaling factor (D) in order to provide a modified signal representative of the magnetizing current in the inductive component; and
adjust the scaling factor (D) such that the value of the modified signal representative of the magnetizing current in the inductive component tends towards the value of the current through the switch during the primary stroke; and
determine the peak magnetizing current value by measuring the modified signal representative of the magnetizing current in the inductive component at the start of a secondary stroke of the switching circuit.

The inductive component may be a transformer, and in such examples, the controller may be configured to integrate the voltage across any winding of the transformer in order to generate the signal representative of the magnetizing current in the transformer. Switching circuits that use a transformer as the inductive component include flyback converters, and embodiments of the invention can be useful for providing feedback whilst maintaining mains isolation between the primary and secondary sides of the transformer without having to use an opto-coupler as is known in the prior art.

The switching circuit may be configured to regulate its output, either directly or indirectly, in accordance with the peak magnetization current. This can provide for improved performance of the switching circuit in accordance with the feedback provided by the controller, which can represent a more accurate value for the output current than is achievable by the prior art.

The circuit may comprise an auxiliary winding coupled to the inductive component, wherein the auxiliary winding can be configured to provide a signal that is useable by the controller to generate the signal representative of the current in the inductive component.

The controller may comprise an integrator configured to generate the signal representative of the magnetizing current in the inductive component, wherein the integrator comprises:

a reset pin, which is configured to receive a reset signal indicative of the magnetizing current in the inductive component being zero, and wherein the integrator is configured to be reset in accordance with the reset signal; and/or an amplifier comprising an offset cancelling circuit.

The reset signal indicative of the current in the inductive component being zero may represent an indication of the end of the secondary stroke, or a turning point (which may be referred to as a "valley" or a "top") in a voltage value at the auxiliary winding, or a turning point in the drain voltage during free resonance. Free resonance is defined as resonance during the interval where both current in the transformer and parasitic capacitances at the transformer winding nodes ring, without forward current flowing in any diode in the output, or auxiliary supply.

The switching circuit may be a flyback converter, a boost converter, a buck converter, or any other type of switched mode power supply (SMPS) where energy is temporarily stored in an inductive component and released to an output thereafter (flyback conversion), or stored and transferred (buck conversion) or released and transferred (boost conversion).

There may be provided a computer program, which when run on a computer, causes the computer to configure any apparatus, including a switching circuit, controller, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

A description is now given, by way of example only, with reference to the accompanying drawings, in which.

Figure 5:
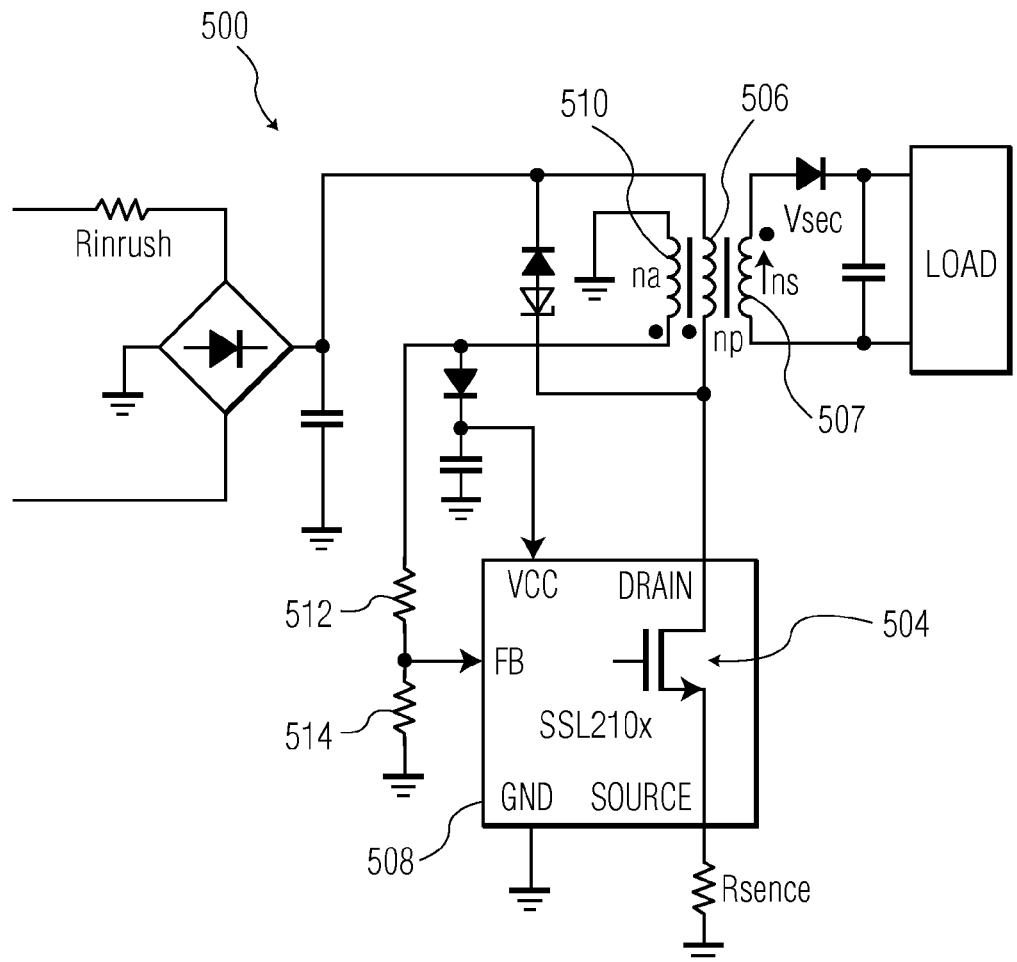
FIG. 5 illustrates a switching circuit according to another embodiment of the invention.
Figure 7:
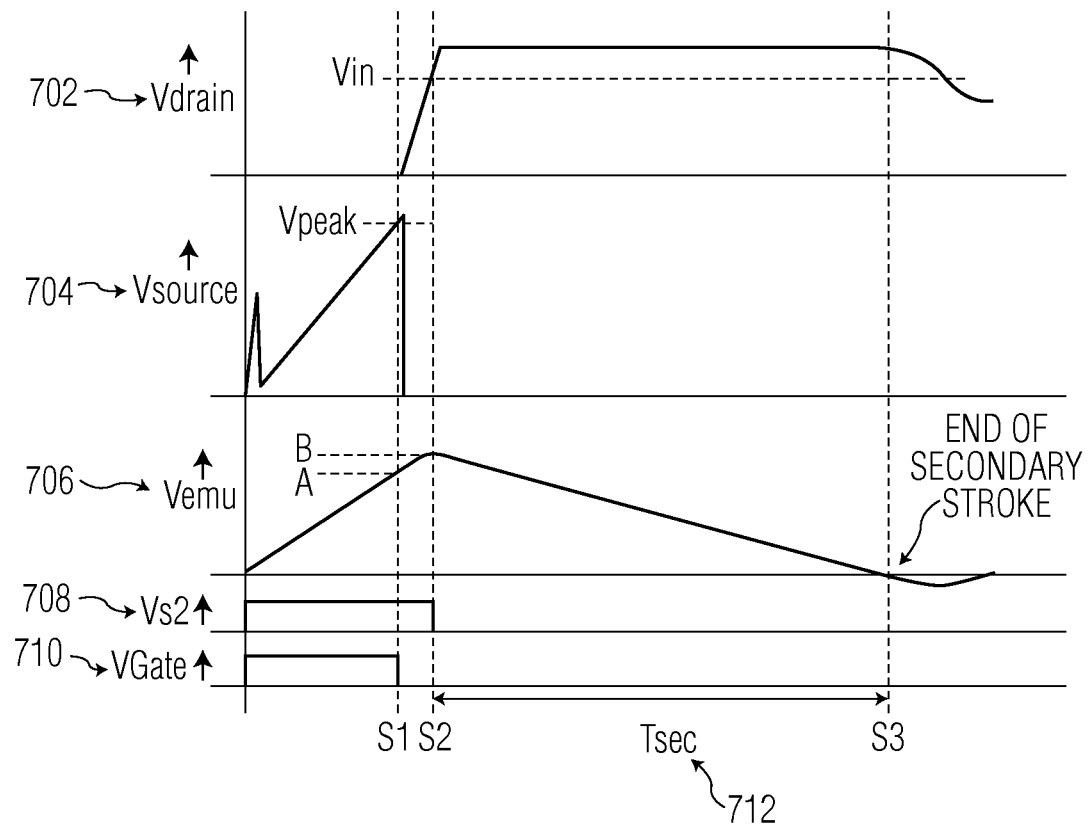
Figure 8:
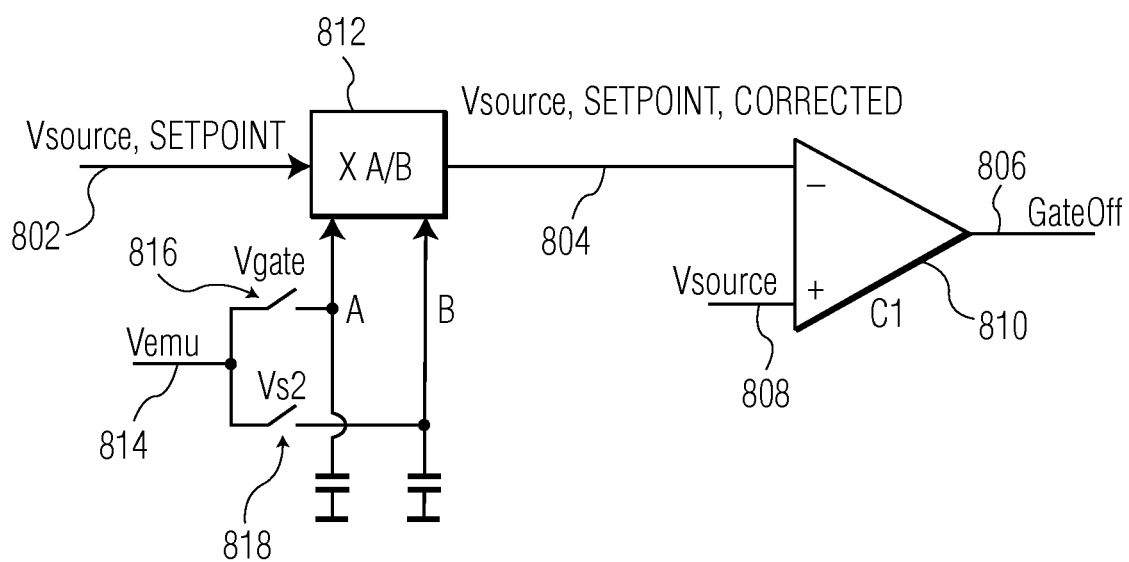
Figure 9:
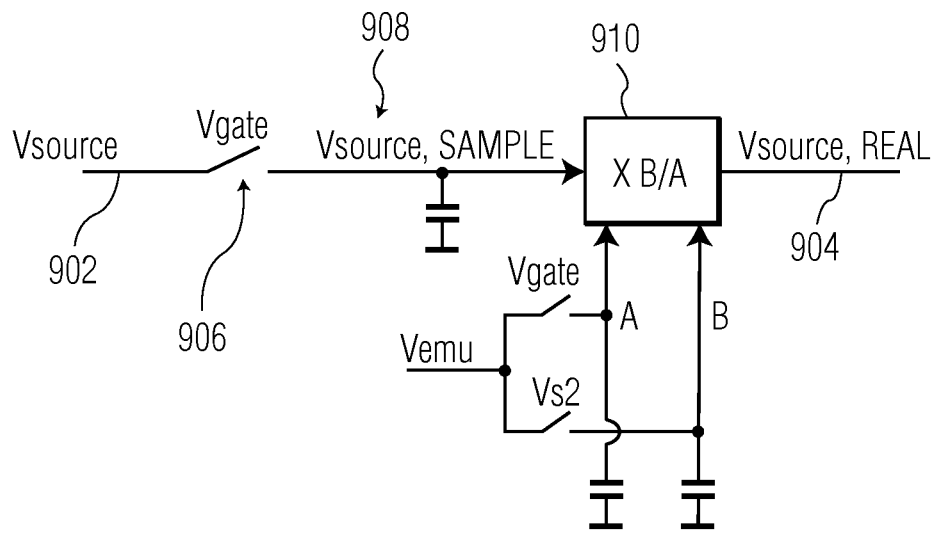
Figure 10:
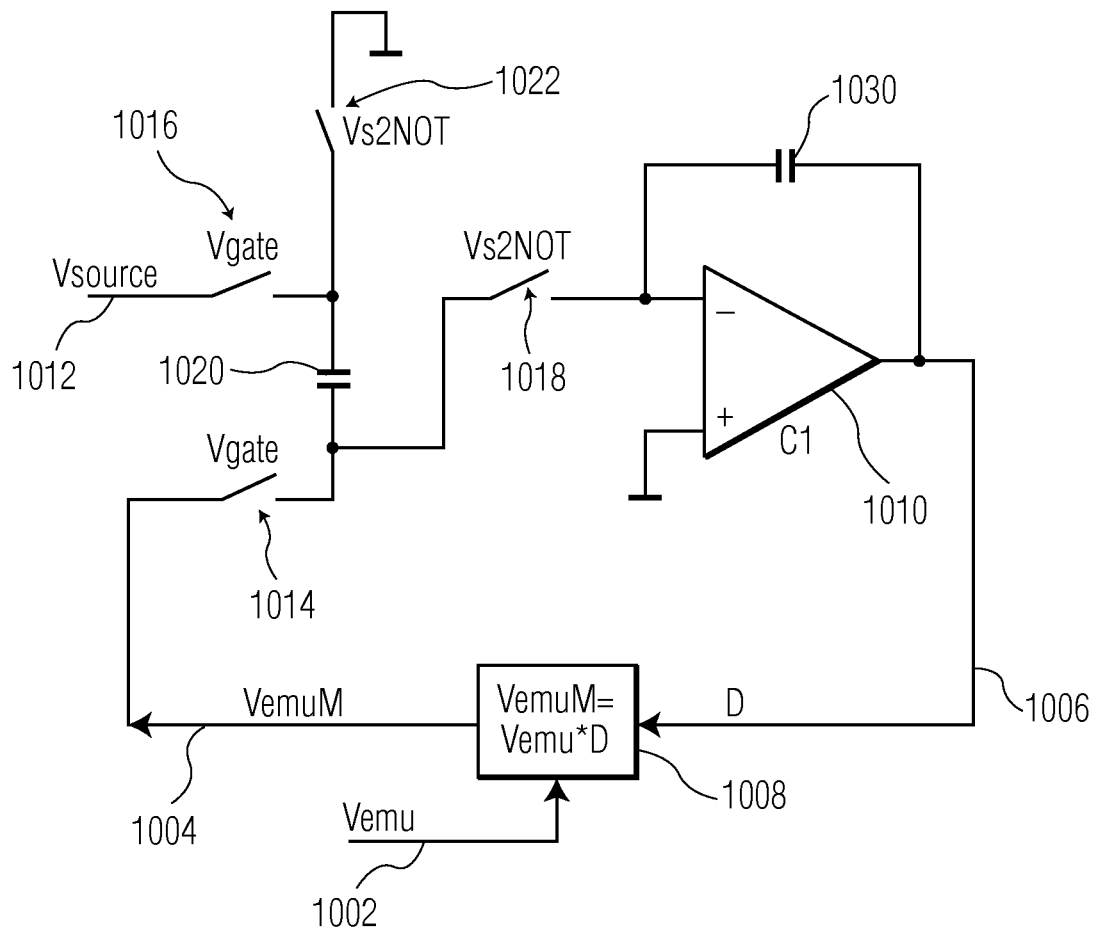
Figure 11:
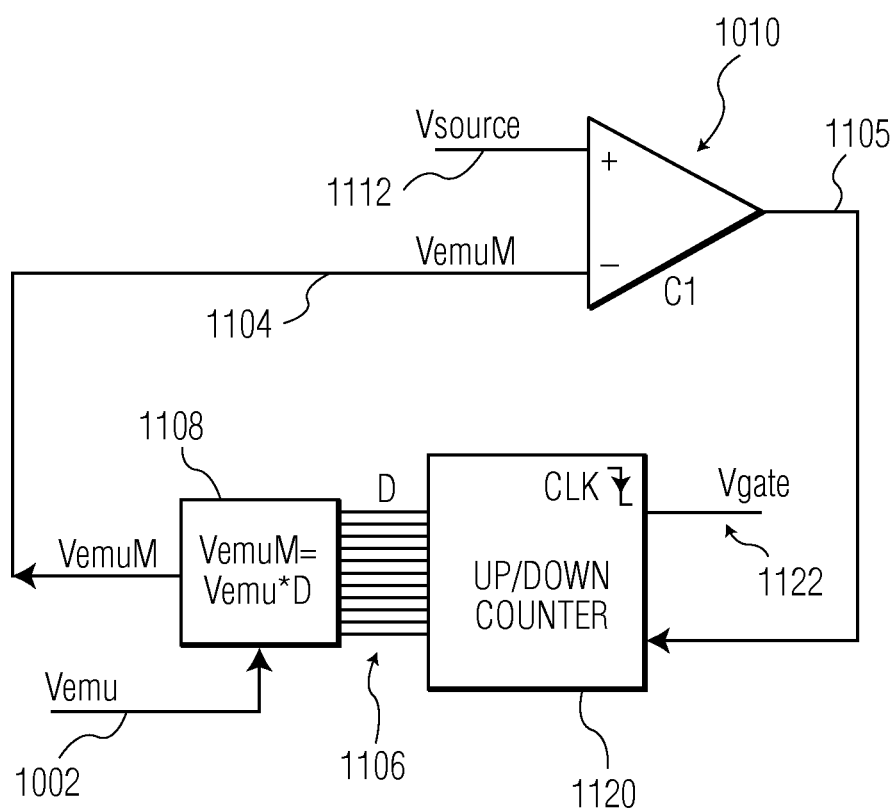
Figure 12:
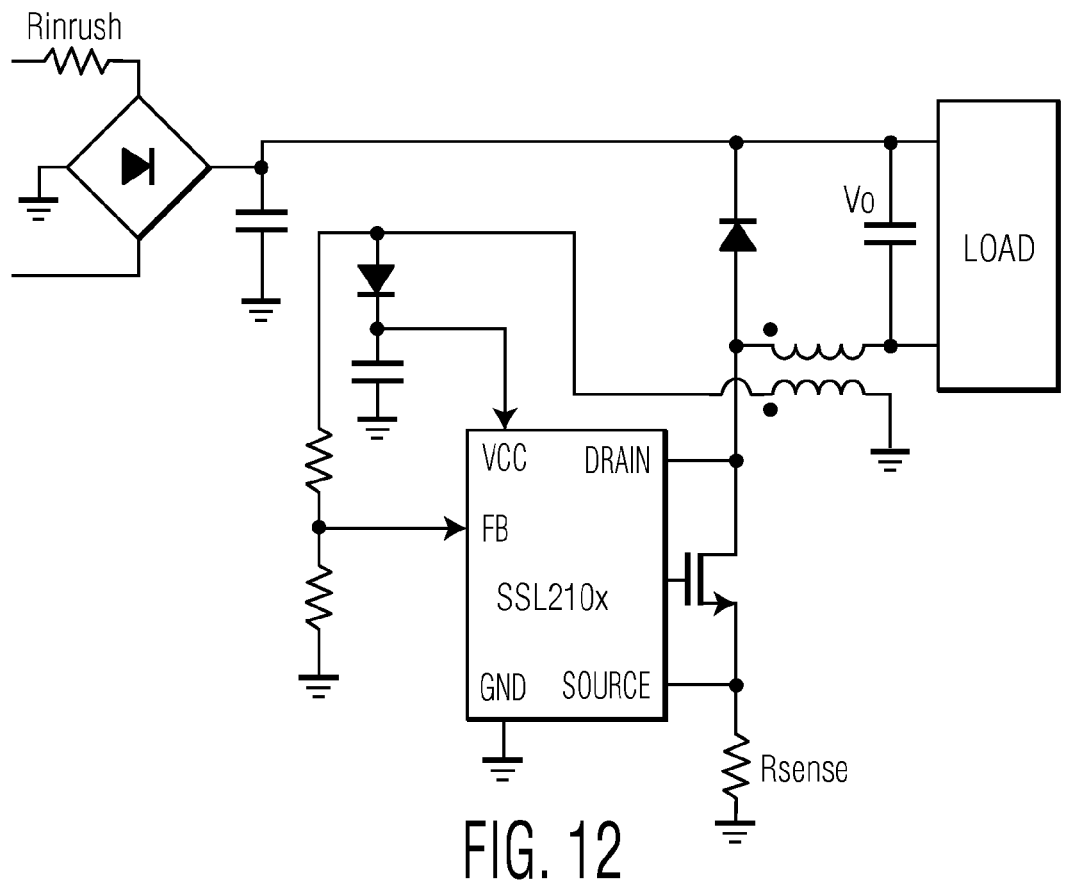
Figure 13:
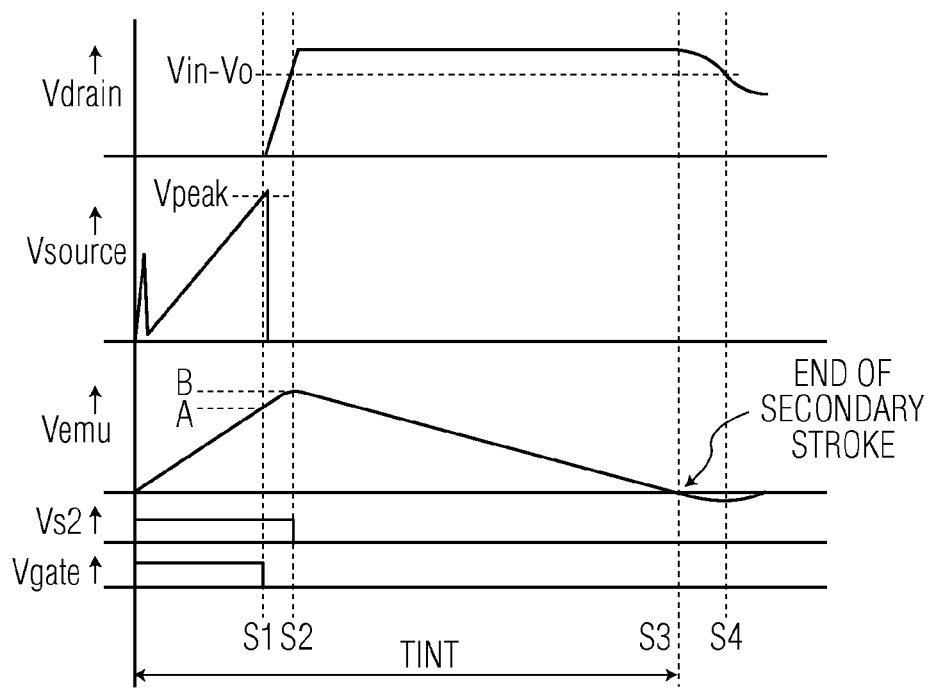
Figure 14:
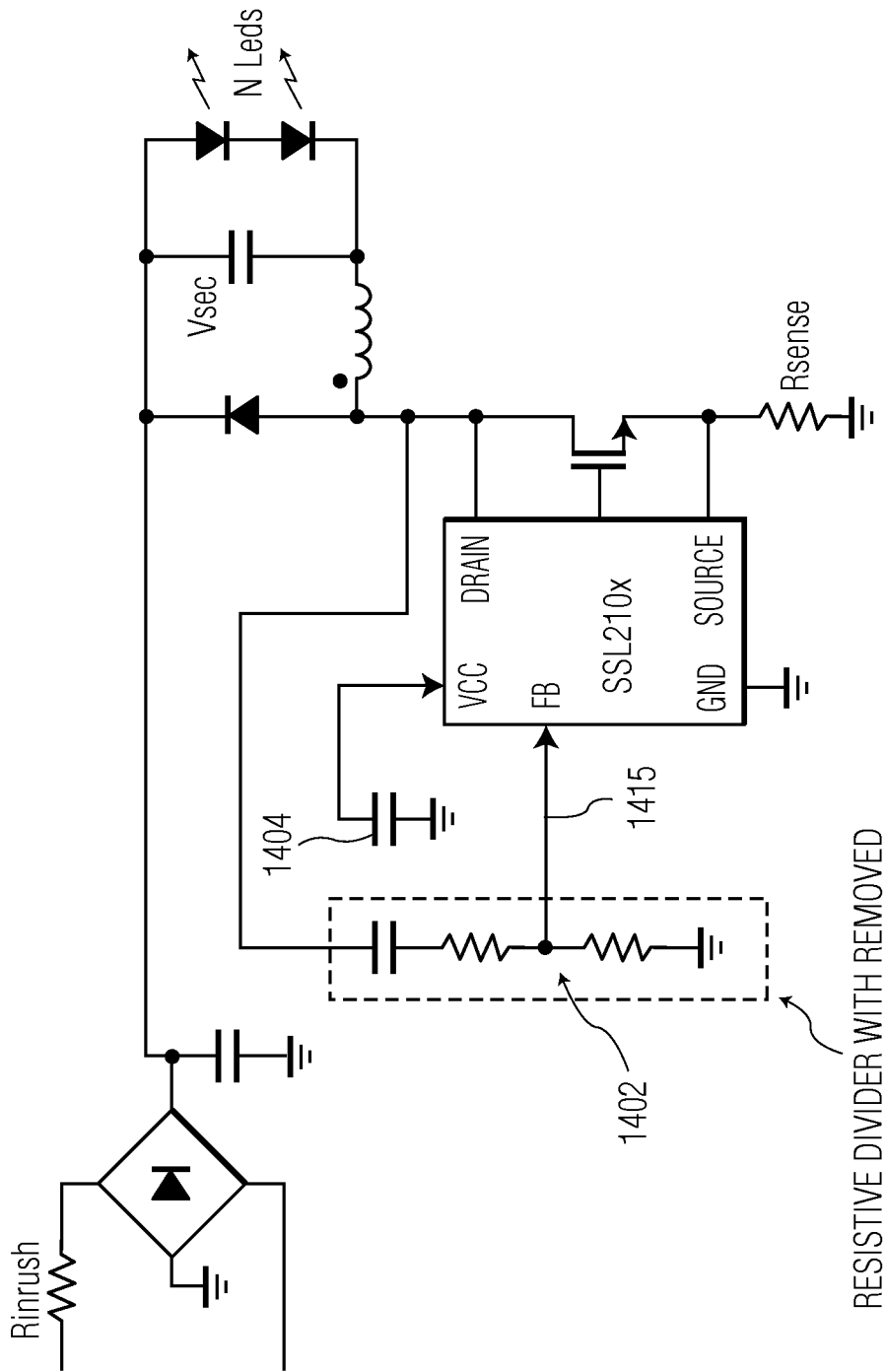
Figure 15:
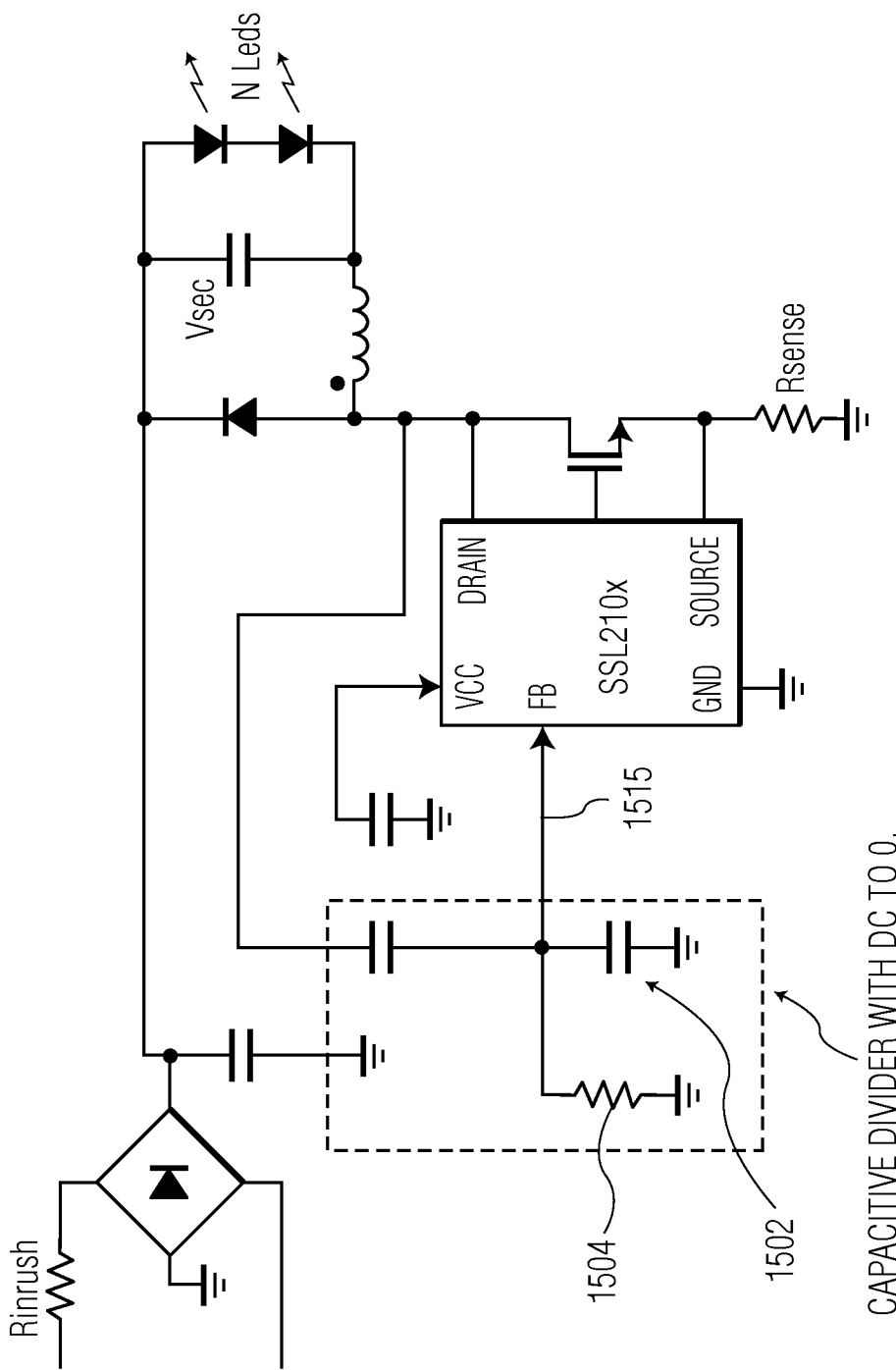
Figure 16:
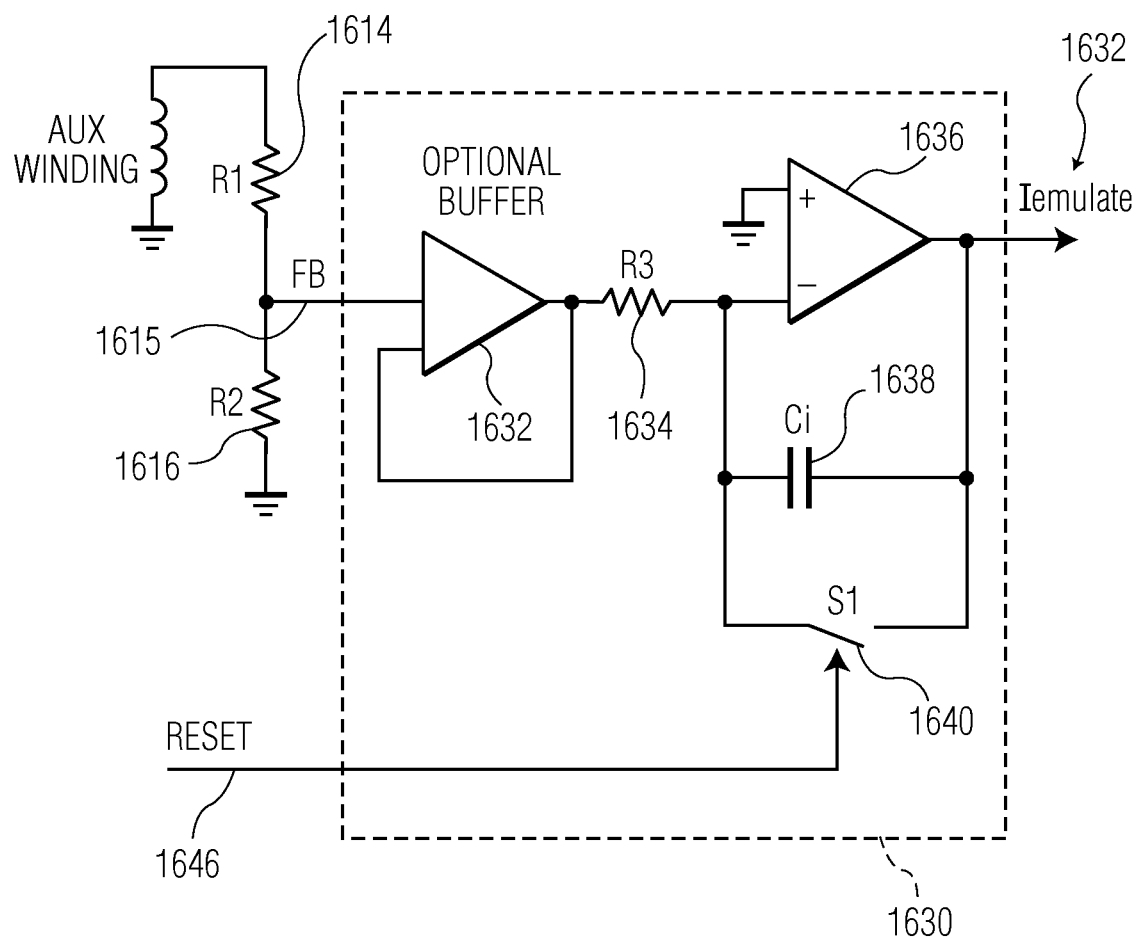

FIG. 7 graphically illustrates current and voltage values at nodes in the circuit of FIG. 5;

FIG. 8 illustrates schematically an embodiment of the invention for reducing the setpoint that the circuit is intended to regulate to;

FIG. 9 illustrates schematically an embodiment of the invention for increasing the recorded voltage at the source of a FET;

FIG. 10 illustrates schematically an embodiment of the invention for adjusting the amplitude of an emulated voltage signal;

FIG. 11 illustrates an embodiment whereby an up/down counter is used to incrementally adjust a scaling factor D;

FIG. 12 illustrates an embodiment of the invention including a Buck converter;

FIG. 13 illustrates example signals in the Buck converter circuit of FIG. 12;

FIGS. 14 and 15 illustrate further examples for providing a signal to a controller according to an embodiment of the invention; and FIG. 16 illustrates an integrator according to an embodiment of the invention that is configured to operate in the voltage domain.

One or more embodiments described herein relate to a switching circuit, such as a flyback converter, that has an inductive component including at least one winding and a switch coupled between a voltage source and the inductive component. Power can be transferred from a voltage source to the inductive component by operating the switch in accordance with a switch control signal.

The switching circuit can also include a controller that is configured to use an emulated signal representative of the magnetic flux (which may also be referred to as magnetization current or magnetizing current) in the inductive component to accurately take into account a peak magnetization current value when controlling the switch. In this way, a more accurate average output current can be provided as the output of the switching circuit can be more accurately controlled.

Figure 1:
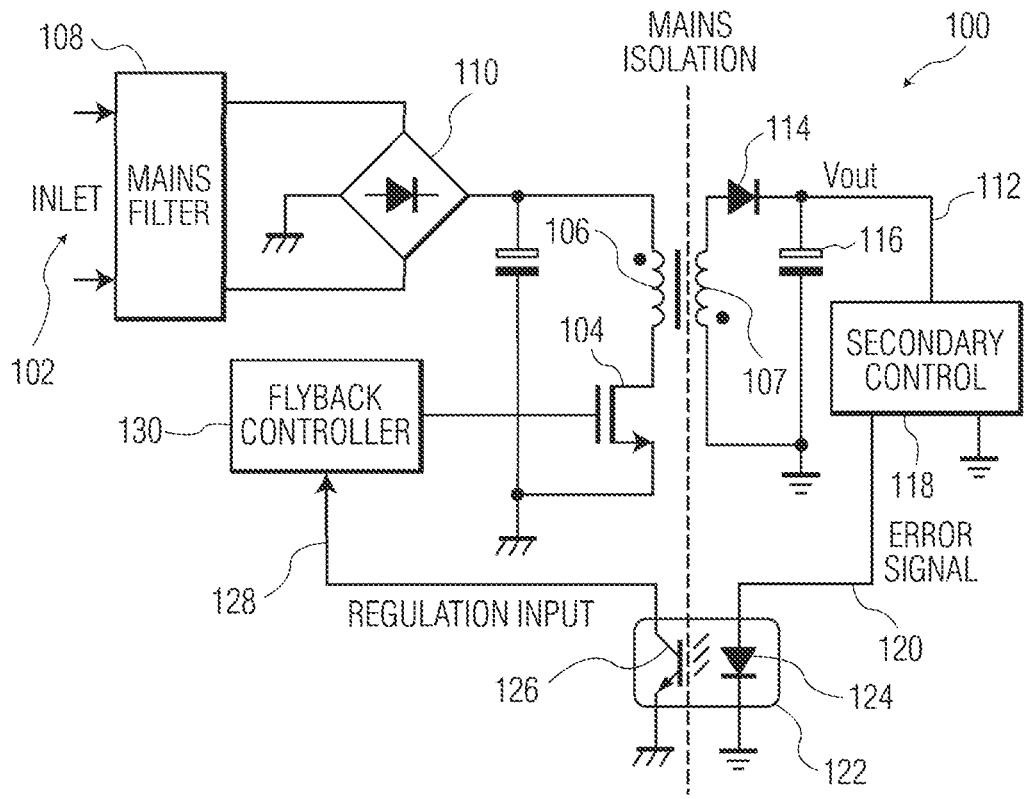
FIG. 1 illustrates a prior art flyback converter with error feedback via an optocoupler.

FIG. 1 illustrates a prior art flyback converter that senses an output variable, generates an error signal 120, and can send the error signal 120 to the primary side of the flyback converter via an optocoupler 122.

The circuit of FIG. 1 receives a mains power signal 102, which is provided to a bridge rectifier 110 via a mains filter 108. The positive output of the bridge rectifier 110 is provided to a first terminal of the primary side 106 of a transformer. The second terminal of the primary side 106 of the transformer is coupled to the drain of a field effect transistor (FET) 104, and the source of the FET 104 is connected to the negative output of the bridge rectifier 110. The FET 104 is configured to operate as a switch that is connected in series with the voltage source 102 and the primary side 106 of the transformer such that power can be transferred from the voltage source 102 to the primary side 106 of the transformer when the switch is closed.

The FET 104 is operated in accordance with a switch control signal received at its gate from a flyback controller 130. The flyback controller 130 is configured to cause the conduction channel of the FET 104 between the source and the drain to periodically conduct (thereby closing the switch) such that a desired output current 112 is provided at the output of the circuit.

The secondary side 107 of the transformer is connected to a diode 114 and a capacitor 116 in series, as is known in the art. The signal at the junction between the diode 114 and capacitor 116 is taken as the output voltage 112, and in this example is also provided to a secondary control component 118. The secondary control component 118 compares the output voltage (or any other output variable, such as current or power) with a reference value in order to generate an error signal 120 representative of the difference between the two signals.

The error signal 120 is provided to the light emitting diode 124 of an optocoupler 122, such that the error signal 120 can be passed from the secondary side of the circuit/transformer to a photo detector 126 of the optocoupler 122 that is associated with the primary side of the circuit/transformer. It will be appreciated that use of an optocoupler 122 maintains isolation between the primary and secondary sides of the circuit, which is a known feature of flyback converters. The signal received at the photo detector 126 is then provided to the flyback controller 130 as a regulation input 128 such that the flyback controller 130 can adjust the operation of the FET/switch 104 in order to regulate the output to the desired level taking into account the error signal that has been received.

In some examples, an optocoupler 122 and a secondary control 118 can be considered as too expensive, and this may be particularly true in the low power adaptor market and LED drivers market. Therefore, it may be desirable to provide a switching circuit that does not include an optocoupler.

In many applications the current has to be limited and controlled to a certain value, for example:

In Low power adapters for battery charging, the current has to be limited and a current regulator is added.

For driving light emitting diodes (LEDs), a current source is needed that generally requires greater accuracy than in adapter applications.

Control of the output current without using an opto-coupler can be performed in different ways:

1. In a first way, the input energy per cycle can be determined and divided by the measured Vout (this Vout has to be measured at the primary side) using the following equation:

$$I_{out\_av} = \frac{\eta \cdot 0.5 \cdot L \cdot I_{peak}^2 \cdot f}{V_{out}}$$

Where:
$I_{out\_av}$ is the average output current;
η is efficiency;
L is the inductance of the transformer of the flyback converter;
$I_{peak}$ is the peak current through the switch, that is the current at the source of the FET;
f is the frequency of operation of the switching circuit; and
$V_{out}$ is the output voltage.

In order to achieve the desired average output current, either the frequency is kept constant and $I_{peak}$ is adjusted, or $I_{peak}$ is kept constant and the frequency is adjusted. These are two modes of operation of a switching circuit.

Disadvantages of using this method are:
The tolerance in the actual value of the inductor affects the accuracy of the output current (8% to 15%);
The efficiency of the converter affects the accuracy of the output current;
The accuracy of the output voltage measurement affects the accuracy of the output current (this can have a spread of at least +/−5% when the output voltage is determined at the primary side);
The output diode introduces an error as the calculation uses $V_{out}$;
The accuracy of the frequency affects the accuracy of the output current;
The measurement of the peak current through the MOSFET affects the accuracy of the output current.

Existing standards can require a maximum spread in the output current of 5%, whereas this method may not be able to achieve a spread that is lower than 10%. Therefore, this method may not be considered acceptable for some applications.

2. A second way of controlling the output current without using an opto-coupler involves calculating the current using the period time, the diode conduction time and the peak current. The following equation can be used to calculate the output current:

$$I_{out\_av} = I_{peak} \cdot \frac{N_p}{N_s} \cdot \frac{T_{sec}}{2 \cdot T_{period}}$$

Where:
$I_{out\_av}$ is the average output current;
$I_{peak}$ is the peak current through the switch, that is the current at the source of the FET;
$N_p$ is the number of turns of the primary winding of the transformer;
$N_s$ is the number of turns of the secondary winding of the transformer;
$T_{sec}$ is the length of time of the secondary stroke; and
$T_{period}$ is the repetition time of the switching circuit, that is, the period of time between the start of successive primary strokes.

This method is used in the NXP chip TEA1401 (1994).

Figure 2:
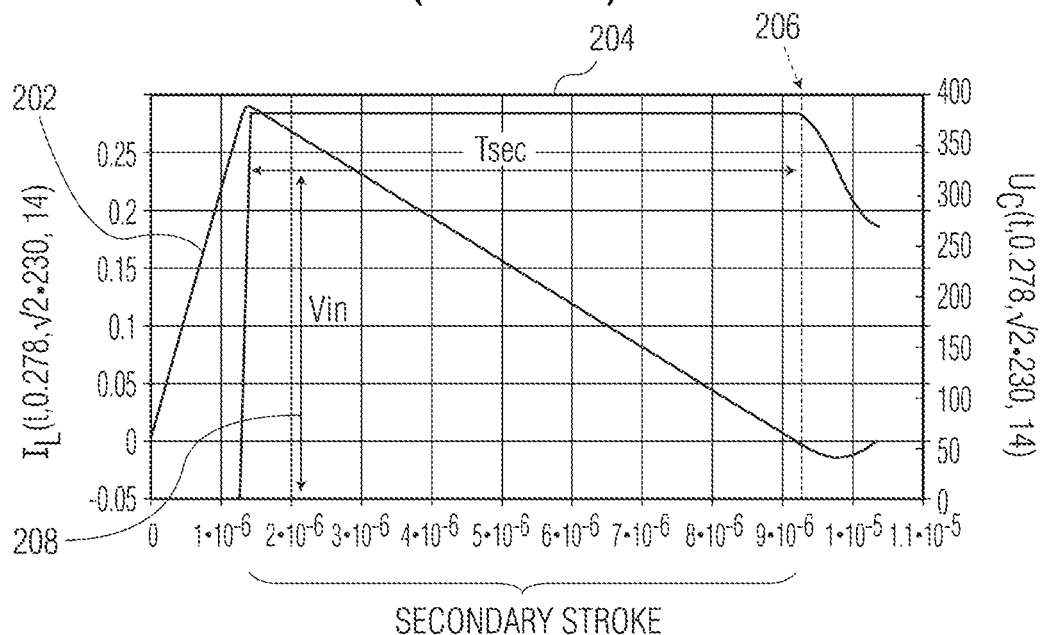
FIG. 2 illustrates graphically the operation of a flyback converter.

FIG. 2 illustrates graphically the magnetization current 202 of the transformer and the drain voltage 204 of the switch at the primary side of a flyback converter. The point in time represented by dotted line 206 represents the end of the secondary stroke. Vin 208 represents the input voltage to the flyback converter, which is the output of the bridge rectifier 110 of FIG. 1.

In order to calculate the output current using this method, the peak current through the MOSFET ($I_{peak}$) is required for use in the above equation. The peak current through the is MOSFET ($I_{peak}$) is not the equal to the peak of the magnetization current of the transformer (which is shown with reference 202 in FIG. 2). In addition, the diode conduction time (Tsec) is also measured (in a flyback system the output current is only flowing during Tsec) for use in the above equation. In a fixed frequency system the period time is set by the integrated circuit (IC). In a variable frequency system the period time has to be measured.

This second method can be more accurate than the first method identified above, as the potentially inaccurate variable "L" is not required to calculate the average output current ($I_{out\_av}$) using the second method.

However, in applications where the determination of the output current should be highly accurate, then use of the peak current ($I_{peak}$) 1 through the switch in the above equations may be considered as not providing an accurate enough value for the output current. A more accurate determination of the output current can be obtained by using the real peak value of the magnetization current. In a flyback converter, only a part of the magnetization current is known, and this is the current through the MOSFET 104 of FIG. 1. The relationship between the magnetization current and the current through the MOSFET is shown in FIG. 3.

Figure 3:
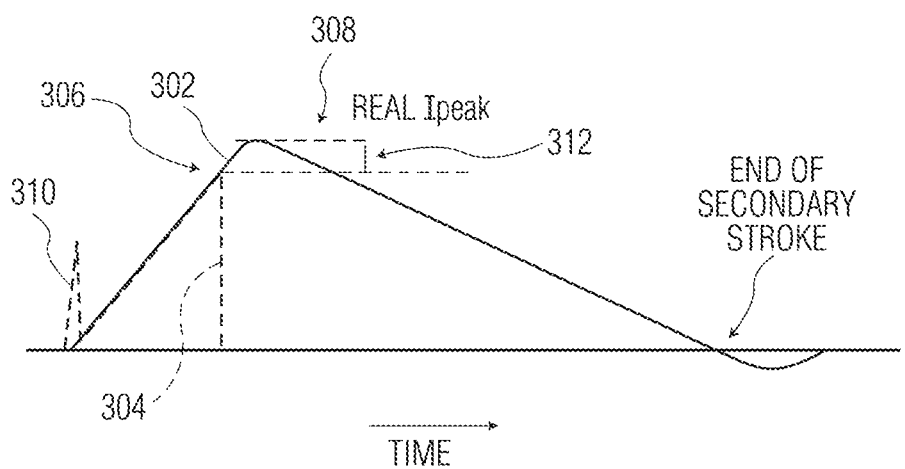
FIG. 3 illustrates graphically the relationship between magnetization current and current through a MOSFET in a flyback converter.

In FIG. 3 time is shown as passing from left to right. Dotted line 304 is the current through the MOSFET and solid line 302 is the magnetization current of the transformer. The current through the MOSFET can be measured at the primary side of the transformer.

It can be seen that the magnetization current 302 is generally equal to the current 304 through the MOSFET (except for the capacitive spike 310) up until the MOSFET is switched off and the current 304 through the MOSFET falls sharply to zero. It can be seen that the magnetization current 302 continues to rise after the current 304 through the MOSFET falls sharply to zero. The magnetization current 302 reaches a "real $I_{peak}$" 308 level that is greater than the maximum value of the current 304 through the MOSFET, and occurs after the maximum value of the current 304 through the MOSFET.

If the peak value of the current through the MOSFET is sampled when the MOSFET is switched off, then the following two errors are introduced:

The peak current 308 of the magnetization current 302 is higher than the peak current 306 of the MOSFET, and this is due to drain rise time of the transformer and the capacitance that is in parallel with the MOSFET. The maximum current caused by the drain rise can be calculated by:

$$I_{peak}(V_{drain} = V_{in}) = \sqrt{V_{in}^2 \cdot \frac{C}{L} + (I_{prim}(V_{gate} = 0))^2}$$

The difference between the peak current 308 value and the peak magnetization current 306 is referred to as an overshoot current 312.

When the gate of the MOSFET is turned off, the current value through the inductor is $I_{prim}(V_{gate}=0)$. Because the drain current is rising, the magnetizing current is also still rising until Vdrain exceeds Vin. This is a function of $V_{in}$, C (capacitor across MOSFET) and L (inductance of the transformer).

Turning off the MOSFET incurs a propagation delay such that the real magnetization current 302 will continue to rise during the delay with the same slope as before. The error made by the delay and the drain rise time error can be calculated using the following equation.

$$I_{peak}(V_{drain} = V_{in}) = \sqrt{V_{in}^2 \cdot \frac{C}{L} + \left(I_{prim}(V_{source} = V_{peak}) + \frac{V_{in} \cdot t_{propagation}}{L}\right)^2}$$

For a typical application the expected delay due to drain rise time and propagation delay error can be calculated as 100 ns. For an average output current level of 0.45 A, an error in the determined average current of at least 10% is introduced when the root mean square (RMS) mains voltage is changed from 90 V to 240 V. Worse still, for an average output current level of 0.3 A, the error in the determined average output current will be more than 15%. As some standards require a maximum of 5% error in the output current, these errors can prevent the standards from being satisfied.

One or more embodiments of the invention can be considered as providing compensation for the errors caused by propagation delay and/or drain rise time. This can be achieved by using an "emulated version" of the magnetization current to compensate for these errors.

Figure 4:
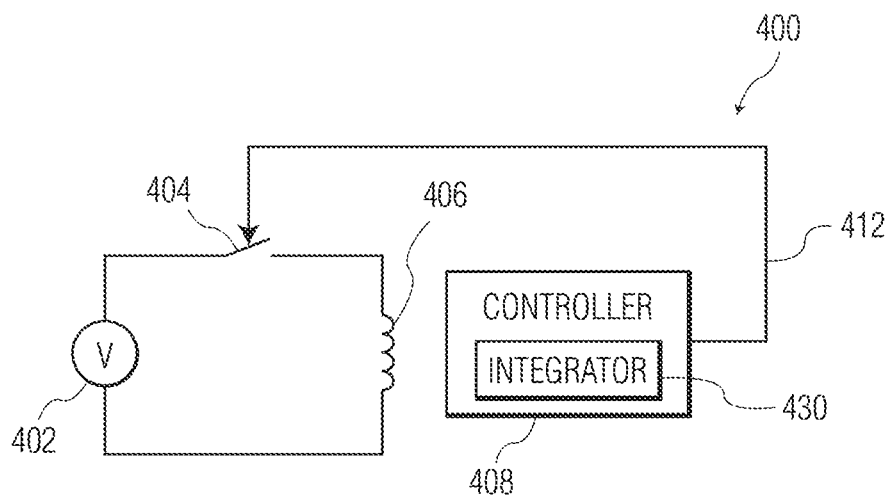
FIG. 4 illustrates a switching circuit according to an embodiment of the invention.

FIG. 4 illustrates a switching circuit 400 according to an embodiment of the invention. The switching circuit 400 comprises a voltage source 402, a switch 404 and an inductive component 406 all connected in series. As is known in the art, the switch 404 is operated in order to selectively transfer power from the voltage source 402 to the inductive component 406. The switch can be a field effect transistor (FET) such as a MOSFET, a bipolar junction transistor (BJT), or any other suitable component(s) that can perform the necessary switching operation.

A primary stroke of the switching circuit can be considered as the period of time between the instant that the switch is closed and the instant of maximum magnetization current in the inductor, and a secondary stroke can be considered as the period of time that magnetic energy is flowing to the output up until the current in the inductive component crosses zero (see FIG. 3). In an alternative embodiment, the primary stroke may be considered as the period of time between the instant that the switch is closed and the time at which the switch is turned off. In this example, the inductive component 406 comprises a single winding, although in other embodiments a transformer having two or more windings may be used.

It will be appreciated that voltage source 402, switch 404 and inductive component 406 can be part of a flyback converter or any other type of switched mode power supply (SMPS) where energy is temporarily stored in an inductor during a primary stroke and transferred to an output during a secondary stroke. Such SMPS's can include a Buck converter, a Boost converter, and a Buck-Boost converter.

The switching circuit 400 also comprises a controller 408 that is configured to output a switch control signal 412 to regulate the switching circuit 400.

In this example, the controller 408 includes an integrator 430 that is configured to integrate the voltage across the inductive component 406 in order to generate a signal representative of a magnetic flux in the inductive component 406. A magnetisation current is a current required to create the magnetic flux within the inductor component 406. Herein, the magnetic flux in the inductive component 406 may be referred to as the magnetization current. The generated signal representative of the magnetization current may be referred to as an emulated current. The controller 408 can then use the emulated current to account for the real peak magnetization current in the inductive component in order to control the switch 404. As discussed above, the real peak magnetization current is shown with reference 308 in FIG. 3.

In one example, the controller 408 can use the signal representative of the current in the inductive component to more accurately determine the average output current such that operation of the switch 404 can be controlled to reduce the difference between the actual output current and the desired output current.

The signal representative of the current in the inductive component can be used to more accurately determine the peak magnetization current value for use in determining the average output current.

Examples of implementations of the controller 408 are provided below.

FIG. 5 illustrates a switching circuit 500 according to another embodiment of the invention. The switching circuit 500 is based on a flyback converter, and components that have been described in relation to the flyback converter of FIG. 1, or are well known in the art, will not be described again here.

The switching circuit 500 includes an auxiliary/additional winding 510 coupled to the primary winding 506 of the transformer. A signal that is experienced by the auxiliary winding 510 due to its magnetic coupling to the windings of the transformer 506, 507 is used as an FB (feedback) input to the flyback controller 508. It will be appreciated that the use of an auxiliary winding 510 maintains the isolation between the primary 506 and secondary 507 windings of the transformer of the flyback converter.

A first terminal of the auxiliary winding 510 is connected to ground, and a second terminal of the auxiliary winding 510 is connected to ground by two resistors 512, 514 in series. The two resistors 512, 514 act as a resistive divider and the junction between the two resistors 512, 514 is connected to the controller 508 to provide the FB input signal to the controller 508. As described in more detail below, in this embodiment it is the voltage at the FB input that is integrated in order to generate a signal representative of the current in the auxiliary winding 510.

In other embodiments an auxiliary winding 510 may not be required, and the signal for the FB input can be provided by a divided drain voltage with the DC component removed. Such other embodiments are described and illustrated below with reference to FIGS. 14 and 15. These embodiments may be particularly advantageous for Buck converters where it can be beneficial to use standard inductors, and not an extra winding.

Figure 6:
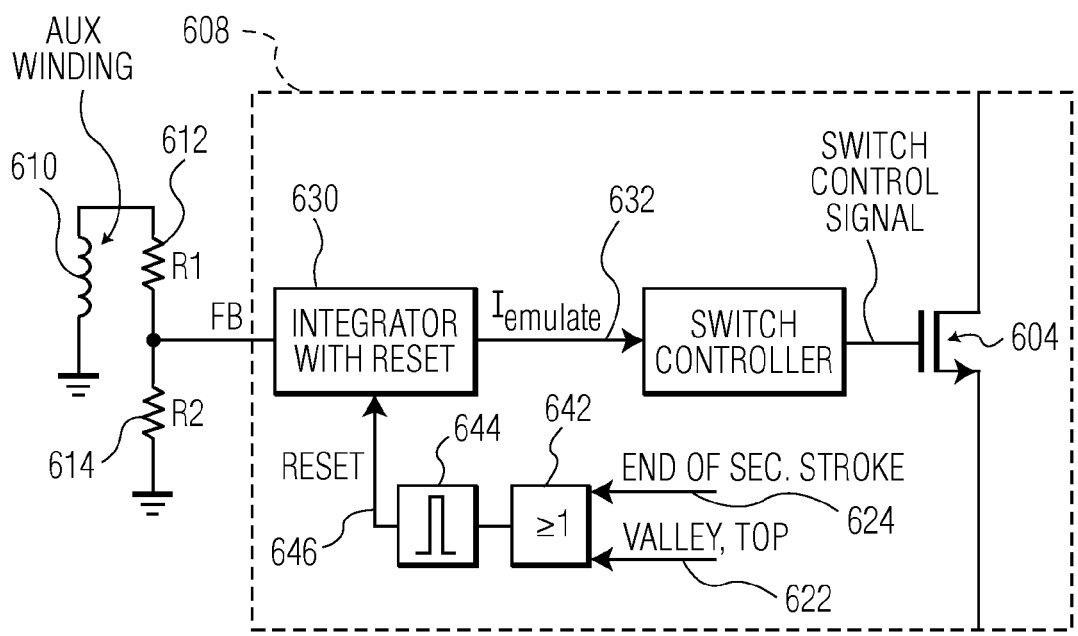
FIG. 6 illustrates a controller according to an embodiment of the invention.

FIG. 6 illustrates further details of a controller 608 according to an embodiment of the invention. Also shown in FIG. 6 are the auxiliary winding 610 and resistive divider 612, 614 that are the same as the corresponding components of FIG. 5.

The controller 608 includes an integrator 630, which is configured to provide an $I_{emulate}$ signal 632 that is representative of the magnetization current in the transformer. The $I_{emulate}$ signal 632 may be considered as an "emulation" of the magnetization current. As described in more detail below, the $I_{emulate}$ signal has the same shape as the current in the "magnetizing inductance" of the transformer. However, the $I_{emulate}$ signal does not necessarily have the same magnitude as the current in the "magnetizing inductance". As is known in the art, the current in the magnetizing inductance is the sum of the currents in all of the individual windings scaled by the turns ratio.

The determination of the $I_{emulate}$ signal 632 can be performed in either the voltage domain, current domain, or digital domain, depending upon the implementation that is chosen. An advantage to using the current domain is that negative voltages at an FB input pin of an associated IC can be prevented, or at least the likelihood of negative voltages at the pin can be reduced. Negative voltages can be undesirable for most integrated circuit (IC) processes, as special constructions may be necessary to account for negative voltages.

Further details of an example integrator 630 are provided below with reference to FIG. 16.

In order to determine the integration constant of the integrator 630, the emulated current ($I_{emulate}$ 632) can be set to an actual value at a "moment in time" when the integrator output 632 is known, thereby regulating the integrator 630. It is known that after the end of the secondary stroke, the voltage across the magnetizing inductance resonates due to the LC circuit provided in combination with the parasitic capacitance at the drain node of the MOSFET switch, thereby causing energy to resonate between the magnetizing inductance and the parasitic capacitance. At the valleys or tops of the resonating voltage, the current in the magnetizing inductance is zero, and therefore the integrator 530 can be reset to zero at the valleys or tops. Therefore, a "valley" or "top" is an example of a "moment in time" that is suitable for resetting the integrator 530.

The "valleys" and "tops" can be considered as moments when the rate of change of the voltage with respect to time (dV/dt) at a switching node (for example the drain node of the primary MOSFET, or the voltage at the auxiliary winding 610) is zero. This so called 'valley' or 'top' can be detected by a circuit called a "valley detector" as is well known in the art, for example as provided by the TEA1507 GreenChip™ II SMPS control IC as manufactured by NXP. A signal that can be received from a valley detector is illustrated by the "valley, top" signal 622 in FIG. 6.

An "end of sec. stroke" signal 624 is shown in FIG. 6, and this signal 624 is set high upon the determination of the end of the secondary stroke. The "end of sec. stroke" signal 624 can be provided by a comparator or any circuit known in the art that can identify the end of the secondary stroke.

As shown in FIG. 6, a logical OR gate 642 is provided, with its inputs provided by the "end of sec. stroke" signal 624 and the valley, top signal 622. The output of the OR gate 642 is provided as an input to a pulse generator 644, the output signal 646 of which is connected to a reset pin of the integrator 630. In this way, the integrator 630 is reset when the emulated current approaches zero or there is a turning point (dV/dt=0) in the voltage at a switching node.

It will be appreciated that this example of resetting the integrator 630 enables a DC level of the integrator 630 to be set and controlled, thereby providing the integrator 630 with the functionality to account for any non-ideal components that occur in practical circuits.

FIG. 7 graphically illustrates current and voltage values at nodes in the circuit of FIG. 5, with time passing from left to right.

The first signal 702 that is shown in FIG. 7 is the voltage at the drain of the FET 504 in FIG. 5.

The second signal 704 is the voltage at the source of the FET 504.

The third signal 706 is the emulated voltage ($V_{emu}$) and represents the voltage that corresponds to the emulated magnetization current ($I_{emulate}$ 632) that is shown in FIG. 6.

The fourth signal 708 of FIG. 7 is labelled Vs2, and is configured such that it goes high when the gate voltage of the FET 504 goes high. The Vs2 signal 708 is configured to go low when the peak of the emulator voltage is reached. In one embodiment, this can be implemented with a comparator that detects when the drain voltage goes through the Vin level (see the first signal 702 of FIG. 7), and in another embodiment when the voltage across an auxiliary winding crosses 0 V.

The fifth signal 710 is the voltage at the gate of the FET 504.

The secondary stroke (Tsec) of the operation of the circuit of FIG. 5 is shown in FIG. 7 with reference 712 and occurs between S2 and S3. Also shown in FIG. 7 are times S1 and S2, whereby S1 represents the time at which the gate of the FET 504 is turned off, and S2 represents the time at which the peak of the magnetization current occurs. The primary stroke can be considered as occurring between 0 and S2 or between 0 and S1. As described in more detail below, the emulated voltage (Vemu) has a value of "A" at time S1 and a value of "B" at time S2. "A" and "B" can be used to compensate for errors in determining the peak magnetization according to some of the embodiments disclosed herein.

Four embodiments for compensating the errors in the peak magnetization current will now be described. As will be appreciated, such compensation can enable the average output current to be determined more accurately.

The following description uses the following terms:
  Vsource, setpoint—the threshold at which the circuit switches off the power switch.
  Vemu—the emulated voltage that corresponds to the emulated magnetizing current. Vemu is determined by integrating a voltage across an inductive component in the circuit. The inductive component can be an auxiliary winding in some examples.

Vs2—is a signal that is used to identify the time of the peak current in the inductive component, and is illustrated in FIG. 7.

Tsec—the length of time of the secondary stroke.

Tperiod—the repetition time of the operation of the circuit. That is, the period of time between the start of successive primary strokes.

$N_p$—the number of turns for the primary winding of the transformer in a flyback converter.

$N_s$—the number of turns for the secondary winding of the transformer in a flyback converter.

EMBODIMENT 1

According to one embodiment of the invention, the threshold at which the circuit switches off the power switch (the peak current setpoint or Vsource, setpoint) can be reduced to take into account the difference between the peak current value through the FET 504 and the peak magnetization current. This overshoot 312 in the current is shown in FIG. 3.

FIG. 8 illustrates schematically an embodiment of the invention for reducing the threshold at which the circuit switches off the power switch. The original value of the threshold at which the circuit switches off the power switch is shown schematically as Vsource, setpoint 802 in FIG. 8. The objective of this embodiment is to correct/adjust the value of Vsource, setpoint 802 so that it can be compared with the voltage at the source of the FET (Vsource 808) and better control the operation of the FET with a GateOff signal 806. The corrected/adjusted value is shown as Vsource, setpoint, corrected 804 in FIG. 8. Vsource does not accurately reflect the peak value of the current through the FET, as discussed above, and therefore this inaccuracy in Vsource can be accounted for by comparing Vsource with the signal Vsource, setpoint, corrected 804.

The Vsource, setpoint signal 802 is provided to a multiplier 812, where it is multiplied by "A/B". The output of the multiplier 812 is the adjusted Vsource, setpoint, corrected signal 804. The Vsource, setpoint, corrected signal 804 is provided as an input to a comparator 810, along with the Vsource signal 808, and the output of the comparator 810 is used to control the gate of the FET with the GateOff signal 806.

The values for "A" and "B" that are used by the multiplier 812 are sampled from the emulated voltage signal (Vemu 814) from the previous cycle of operation through timely operation of switches 816, 818. A first switch 816 is operated by a Vgate signal to sample Vemu 814 when the gate of the FET goes low in order to provide the value of "A" for the multiplier 812. This corresponds to the value of "A" shown at time S1 in FIG. 7. Similarly, a second switch 818 is operated by a Vs2 signal in order to provide the value of "B" for the multiplier 812, and this corresponds to the value of "B" shown at time S2 in FIG. 7.

It will be appreciated that the values for A and B should be sampled from the previous cycle, as the corrected setpoint signal 804 is needed before the B value can be determined in order to avoid introducing delays.

This embodiment of the invention can reduce the target value for the voltage at the source of the FET (Vsource, setpoint) such that it is suitable for comparing with the measured value for the voltage at the source of the FET, and take into account an expected overshoot in the magnetization current compared with the current through the FET based on the measured operation of a previous cycle of operation.

The Vsource, setpoint value can be used to calculate the average output current using the following equation, whereby the non-corrected version of the Vsource, setpoint signal (as opposed to the Vsource, setpoint, corrected signal that is actually used to control operation of the FET) provides a more accurate reflection of the maximum voltage than is achievable with the prior art.

$$I_{out\_av} = \frac{V_{source\_setpoint}}{R_{sense}} \cdot \frac{N_p}{N_s} \cdot \frac{T_{sec}}{2 \cdot T_{period}}$$

According to this embodiment, there is no compensation of the delay of comparator 810, the delay of the driver is compensated, and the error of the multiplier 812 is the error that will be present in the calculated average output current. Also this embodiment of the invention only works for a peak current controlled system.

This embodiment can also be provided by using the emulated voltage/current and performing the required mathematics using digital operations.

In embodiments where the average output current is to be controlled, integration may be necessary. This can be implemented by internal capacitors, an external capacitor or a digital integrator, as non-limiting examples. The control algorithm will regulate the Vsource, setpoint parameter in order to set the following expression to be equal to zero:

$$\int_0^{T_{period}} I_{out\_av} dt - \frac{N_p}{2N_s \cdot R_{sense}} \cdot \int_{S2}^{S3} V_{source\_setpoint} dt$$

The Iout_av value in this equation is the desired value, and is constant.

EMBODIMENT 2

According to another embodiment of the invention, the recorded value of the voltage at the source of the FET (Vsource) can be increased to take into account the overshoot/error between the peak current value through the FET 504 and the peak magnetization current. In this way, an adjusted value of the voltage at the source of the FET can be compared with the (unadjusted) setpoint value to improve the accuracy of operation.

FIG. 9 illustrates schematically an embodiment of the invention for increasing the recorded voltage at the source of the FET (Vsource 902). This embodiment can be used with both peak current control and voltage mode control (on-time control) of the circuit. In examples that use peak current control, the increased values for the voltage at the source (Vsource, real 904) can be directly compared with an unmodified value for the threshold at which the circuit switches off the power switch (the peak current setpoint or Vsource, setpoint).

In this embodiment, the Vsource signal 902 is sampled when the gate signal goes low by operation of switch 906, which is at time S1 in FIG. 7. This sampled value of Vsource is labelled Vsource, sample 908 in FIG. 9 and is provided as an input to a multiplier 910. The other inputs for the multiplier 910, namely "A" and "B" are sampled in the same way as for FIG. 8.

The multiplier is configured to multiply the Vsource, sample signal 908 by "B/A" in order to provide the increased value of the voltage at the source of the FET when the gate goes low, and this signal is labelled Vsource, real 904 in FIG. 9.

The values for "A", "B" and Vsource, sample can be taken from the primary stroke. For a buck converter A, B and Vsource, sample have to be determined from the previous cycle as integration will have started before $I_{peak}$, A and B have been determined.

In this embodiment, the Vsource, real signal 904 can be used to calculated the average output current:

$$I_{out\_av} = \frac{V_{source\_real}}{R_{sense}} \cdot \frac{N_p}{N_s} \cdot \frac{T_{sec}}{2 \cdot T_{period}}$$

As with the previous embodiment, the error of the multiplier 910 is the error that will be present in the calculated average output current.

Once again, this embodiment can also be provided by using the emulated voltage/current and performing the required mathematics using digital operations.

In embodiments where the average output current is to be controlled, integration may be necessary. This can be implemented by internal capacitors, an external capacitor or a digital integrator. The control algorithm will regulate the maximum Vsource value (current mode control) or the on-time (voltage mode control) parameters in order to set the following expression to be equal to zero:

$$\int_0^{T_{period}} I_{out\_av} dt - \frac{N_p}{2N_S \cdot R_{sense}} \cdot \int_{S2}^{S3} V_{source\_real} dt$$

The Iout_av value in this equation is the desired value and is constant.

EMBODIMENT 3

According to another embodiment of the invention, a scaling factor (D) can be applied to the emulated voltage such that it can be used to directly record the peak value for the magnetization current, and hence can be used to accurately determine the average output current.

FIG. 10 illustrates schematically an embodiment of the invention for adjusting the amplitude of the emulated voltage signal Vemu 1002 to a modified emulated signal VemuM 1004 that can be used in calculations to accurately determine the average output current. This embodiment updates a scaling factor "D" 1006 that is applied to the emulated voltage Vemu 1002 whilst the voltage (Vgate) at the gate of the FET is low and a Vs2NOT signal is high. The Vs2 signal is described above in relation to FIG. 7, and it will be appreciated the Vs2NOT signal is the inverse of the Vs2 signal. In this way, the scaling factor is adjusted such that that the modified signal VemuM 1004 is brought into line with the voltage at the source of the FET (Vsource 1012). When the voltage at the gate of the FET is low and Vs2NOT is low, the scaling factor is fixed. In this way, the emulated voltage signal Vemu 1002 continues to rise after the voltage at the source Vsource drops to zero, and is scaled by a value such that it is representative of the magnetization current in the transformer of a flyback converter.

This operation can be further explained with reference to FIG. 3, whereby a scaling factor is applied to the emulated voltage such that it follows the same slope of the current through the FET (line 302 in FIG. 3), but instead of dropping to zero when the gate voltage goes low, the emulated voltage continues to rise (using the same scaling factor) until it reaches the real peak magnetized current value (308 in FIG. 3).

Returning to FIG. 10, the emulated voltage signal Vemu 1002 is provided as an input to a multiplier 1008. The emulated voltage signal Vemu 1002 is multiplied by "D" (discussed below) in order to provide the modified emulated voltage signal VemuM 1004. The difference between VemuM 1002 and Vsource 1012 is stored at capacitor 1020. The stored difference voltage can be supplied to the inverting input of amplifier 1010. When the difference is positive the value of D will decrease. When the difference is negative the value of D will increase. The amplifier 1010 has a capacitor 1030 connected between its output and inverting input in order to provide an integrator.

A first switch 1014 is provided between the output of the multiplier that provides the VemuM signal 1004 and a first plate of capacitor 1020. The first switch 1014 is operated in accordance with the Vgate signal (see FIG. 7). A second switch 1016 is connected between Vsource 1012 and a second plate of the capacitor 1020. The second switch 1020 is also driven by the Vgate signal. Sampling of the voltage difference between VemuM and Vsource across the capacitor 1020 occurs when Vgate is high. When the gate is turned off and Vgate switches from high to low, the signal has been sampled.

A third switch 1018 is connected in series between the first plate of the capacitor and the inverting input of the amplifier 1010. The third switch is controlled by a Vs2NOT signal. A fourth switch 1022 is connected between the second plate of the capacitor 1020 and ground. When the Vs2NOT signal goes high, the second input of capacitor 1020 is connected to ground via fourth switch 1022 and the first input of capacitor 1020 is connected to the inverting input of amplifier 1010 by the third switch 1018. The difference charge (caused by the difference of VemuM and Vsource) is dumped in capacitor 1030, which results in a change of signal D 1006. The non-inverting input of the amplifier is coupled to ground.

The circuit of FIG. 10 can therefore store the difference between VemuM and Vsource on capacitor 1020 when Vgate is high. When Vgate is set low the sampled value will be retained by the capacitor. This sampled value is used to update the amplifier 1010. When the first 1014 and second 1016 switches are open (Vgate is low) and the third 1018 and fourth 1022 switches are closed (Vs2Not is high), the integrator is updated and therefore the output signal D 1006 of the integrator is updated. When the third switch 1018 is open signal D 1006 is kept constant.

In some embodiments, the scaling factor (D) is updated once for every switching cycle. In other embodiments, the switching cycle may not require updating very often as it is unlikely to significantly change between operating cycles of the circuit. For example, the required D value can change slowly when the temperature changes. Therefore, embodiments of the invention can update the gain (D 1006) once per mains cycle, for example by sampling the difference between Vemu 1004 and Vsource 1012 signals using switches that are controlled by signals derived from a mains input.

The output of the Amplifier 1010 is the signal labeled "D" 1006 and is provided to the multiplier 1008 so that the modified emulated voltage signal VemuM 1004 is brought closer to the Vsource signal 1012 during the primary stroke of the circuit.

According to this embodiment, the amplitude of VemuM 1004 is adjusted by a control loop such that VemuM 1004 is made equal to Vsource 1012 during the primary stroke. The peak value of the emulated magnetization current can then be used as the real Ipeak. This is independent of peak current mode control or voltage mode control (on-time control).

In this embodiment, the gain of the emulator function is changed such that the emulator current follows the source current during the primary stroke.

The maximum VemuM can be used to calculate the average output current:

$$I_{out\_av} = \frac{V_{emuM\_max}}{R_{sense}} \cdot \frac{N_p}{N_s} \cdot \frac{T_{sec}}{2 \cdot T_{period}}$$

In embodiments where the average output current is to be controlled, integration may be necessary. This can be implemented by internal capacitors, an external capacitor or a digital integrator. The control algorithm will regulate the maximum Vsource value (current mode control) or the on-time (voltage mode control) parameter in order to set the following expression to be equal to zero:

$$\int_0^{T_{period}} I_{out\_av} dt - \frac{N_p}{2N_s \cdot R_{sense}} \cdot \int_{S2}^{S3} V_{emuM\_max} dt$$

The period of time between S2 and S3 represents the secondary stroke, as illustrated in FIG. 7.

The Iout_av value in this equation is the desired value and is constant.

EMBODIMENT 4

According to another embodiment of the invention, which has similarities with embodiment 3 described above, the emulator voltage is integrated during the secondary stroke in order to determine Iout_ay. This is in contrast to embodiment 3 whereby Iout_av is calculated as a function of Tsec and Ipeak.

For the average output current, the following equation holds:

$$I_{out\_av} = \frac{1}{T_{period}} \cdot \int_0^{T_{period}} I_{out} dt = \frac{1}{T_{period}} \cdot \frac{N_p}{N_s} \cdot \int_{S2}^{S3} \frac{V_{emuM}(t)}{R_{sense}} dt$$

As above, the period of time between S2 and S3 represents the secondary stroke, as illustrated in FIG. 7. This equation applies for both peak current mode control and voltage mode control (on-time control).

In embodiments where the average output current is to be controlled, integration may be necessary. This can be implemented by internal capacitors, an external capacitor or a digital integrator. The control algorithm will regulate the following equation to 0 by changing the maximum Vsource value (current mode control) or the on-time (voltage mode control):

$$\int_0^{T_{period}} I_{out\_av} dt - \frac{N_p}{N_s \cdot R_{sense}} \cdot \int_{S2}^{S3} V_{emuM}(t) dt$$

The Iout_av value in this equation is the desired value and is constant.

A principle that can be applied by embodiments 3 and 4 is to adapt the gain of the emulator in such a way that during the primary stroke the emulator voltage is equal to the source voltage, and therefore the emulated magnetization current is made equal to the actual magnetization current. In the example described above, Vsource 1012 and VemuM 1004 are sampled at the moment the gate of the FET goes low. These sampled values are compared with each other, and if they are not the same, then the gain of the emulator is adjusted. Of course, it is also possible to integrate the source voltage and integrate the emulator voltage for a period of time and compare the results of these integrations (when the gate goes low) to adjust the gain of the emulator.

Adjusting the gain of the emulator can also be implemented in a digital way. For example, when the emulator voltage is too low, the gain is increased by one step/increment. When the emulator voltage is too high, the gain is decreased by one step/increment. Alternatively, the gain can be adjusted when it is not within a range of values, for example by use of a window comparator.

FIG. 11 illustrates an embodiment whereby an up/down counter 1120 is used to incrementally adjust the scaling factor D 1106 that is applied to the Vemu signal 1102 by the multiplier 1108. The up/down counter 1120 is clocked by the Vgate signal 1122 so that the gain (D 1106) that is applied to the emulated voltage signal Vemu 1120 is only adjusted at a falling edge of the Vgate signal 1122, that is, once every switching cycle. In another example, the up/down counter 1120 can be clocked once every mains cycle instead of once every switching cycle.

Input is supplied to the up/down counter 1120 from a comparator 1110 output. The comparator 1110 compares the VemuM signal 1104, supplied to its inverting input, with a Vsource signal 1112, supplied to its non-inverting input. The Vsource signal 1112 and VemuM signal 1104 in this example are analogous to the Vsource signal 1012 and VemuM signal 1004 in FIG. 10. The comparator provides a positive output to the up/down counter 1120 if Vsource 1112 is greater than VemuM 1104 and a negative output if Vsource 1112 is less than VemuM 1104. The polarity of the output determines whether the count is increased or decreased. The comparator 1110 output in this example is processed at a specific moment in time, related to a logic state of the system. The falling edge of Vgate can be used as a signal for comparison to occur, or the result of the comparison to be used.

It will be appreciated that FIG. 11 provides just one of numerous potential digital implementations for providing an emulator with a gain that is updated in accordance with an embodiment of the invention. A principle that is applied by such embodiments is to adjust the gain of the emulator by comparing the primary current with the emulator output, and this can include a comparison between the filtered or integrated source voltage and the filtered of integrated emulator voltage.

The average output current can be controlled in any way that is known in the art, and include methods that are implemented in the TEA1401 integrated circuit (with an external capacitor). Any specific method of controlling the average output current is outside the scope of this disclosure.

Embodiments disclosed herein use an emulator, which can use analogue or digital integration. The input of the emulator can be generated by a winding or by a dc-decoupled measurement of the drain voltage of the primary MOSFET. For a Buck converter, an extra winding on the coil can be undesirable.

Although the above embodiments have been described with reference to a flyback converter, it will be appreciated that other types of converters can also be used with embodiments of the invention. For example:

Buck-boost converter: This is the same as a flyback converter without isolation.

Boost converter: This system can have an output current that flows during a secondary stroke and not during a primary stroke (which may be referred to as a discontinuous output). This is similar to a flyback converter, and therefore the principles described with reference to the four embodiments above can also be used with a Boost converter. The measured Ipeak current through the MOSFET may have to be adjusted by the emulator to get the real output current in the periods where the diode is conducting.

Buck converter: The buck converter is slightly different, because the inductor current is equal to the output current. An embodiment that relates to a buck converter is provided below.

FIG. 12 illustrates an embodiment of the invention including a Buck converter. With a Buck converter the load is connected to the high voltage, and therefore the load current high side should not be measured. Therefore, the peak current at the low side is measured. When the system runs in SOPS (Self Oscillating Power Supply) mode the output current is almost equal to the peak current divided by two. When a higher power factor or the frequency has to be limited, a similar method as described for the Flyback converter can be used.

FIG. 13 illustrates example signals in the Buck converter circuit of FIG. 12, and the signals that are shown in FIG. 13 are similar to those described above with reference to FIG. 7. Shown in FIG. 13 is a period of time labeled Tint, which represents the primary and secondary strokes, but not any ringing that occurs after the end of the secondary stroke.

As the output current of the Buck converter is continuous, that is it flows during both primary and secondary strokes, the methods of embodiments 1 to 3 above can be difficult to implement as the ringing in the output current is not taken into account. The ringing current in a Buck converter flows through the load. An approximation can be made by replacing Tsec with Tint in the equations for calculating Iout_ay. The regulation algorithm for Flyback converters includes an integration that is started at S2, but for a Buck converter, this integration has to start at 0. In the Buck converter case, we always need to use the sample for Ipeak, A and B from a previous cycle. However, as indicated above, for some embodiments that use a Flyback converter, samples from a current cycle can be used as integration is not started until after Ipeak, A and B are recorded from a present cycle.

Embodiment 4 can be considered as most suitable for a Buck converter, as the emulator signal is adjusted and continuously available. For the average output current the following equation holds:

$$I_{out\ av} = \frac{1}{T_{period}} \cdot \int_0^{T_{period}} I_{out} dt = \frac{1}{T_{period}} \cdot \int_0^{T_{period}} \frac{V_{emuM}(t)}{R_{sense}} dt$$

In embodiments where the average output current is to be controlled, integration may be necessary. This can be implemented by internal capacitors, an external capacitor or a digital integrator. The control algorithm will regulate the following equation to 0 by changing the maximum Vsource value (current mode control) or the on-time (voltage mode control):

$$\int_0^{T_{period}} I_{out\_av} dt - \frac{1}{R_{sense}} \cdot \int_0^{T_{period}} V_{emuM}(t) dt$$

The Iout_av value in this equation is the desired value and is constant.

In other examples, an auxiliary winding may not be required to provide the signal representative of the voltage across the inductive component that is integrated to obtain the emulated signal. The signal representative of the voltage across the inductive component can be provided by any other suitable means. For example, a resistive divider 1402 in series with a blocking capacitor 1404 can be used to provide the signal to the FB pin of the controller, as shown in FIG. 14. Alternatively, a capacitive divider 1502 with a resistor 1504 in parallel with the capacitor that is connected to ground can be used to provide the signal to the FB pin of the controller. It will be appreciated that any known way of providing a signal that can be integrated in order to generate a signal representative of a magnetization current in the inductive component and can be used to determine the output current of the switching circuit can be used, and that an auxiliary winding is just one example of a component that can do this.

FIG. 16 illustrates an integrator 1630 according to an embodiment of the invention that is configured to operate in the voltage domain, although it will be appreciated that the integrator function can be realized in many ways. The integrator 1630 receives an FB input 1615 from a resistive divider 1614, 1616 in the same way as discussed with reference to FIG. 5. In this embodiment, the voltage at the FB input pin 1615 is also available for sensing the output voltage. The integrator 1630 includes an operational amplifier (opamp) 1636 with integrator function using a feedback capacitor Ci 1638 between the opamp output and the negative input of the opamp 1636. The voltage to be integrated is first converted to a current by resistor R3 1634, and then integrated via the feedback capacitor Ci 1638.

In order to sense the output voltage accurately, an optional buffer 1632 can be provided between the FB input pin 1615 and the input to the opamp 1636. This may be required if the internal conversion resistor (R3 1634) is not large compared to the external divider (R1 1614 and R2 1616), which is typically the case as R1 1614 and R2 1616 are external resistors and R3 1634 is an internal resistor. In fact, in some embodiments the buffer 1632 may not be needed for the integrator function because the output signal Iemulate 1632 will be compared with a value of about zero—this means that the scaling factor of the integrator 1630 may not be important in determining the shape of the Iemulate signal 1632, and it will still return to zero at about the same time even if the scaling is incorrect. However, in embodiments where the FB node 1615 is used for voltage sensing, the optional buffer 1632 may be used to prevent, or reduce, a voltage division error.

Applications for embodiments disclosed herein include:
LED applications that use Buck, boost, Buck-boost or Flyback converters.
Adapter applications where accurate currents for battery charging are required.
Any other current driven application.

The invention claimed is:

1. A switching circuit comprising:
an inductive component including at least one winding;
a switch configured to transfer power from a voltage source to the inductive component in accordance with a switch control signal; and
a controller, configured to:
integrate the voltage across the inductive component in order to generate a signal representative of magnetic flux in the inductive component; and
use the signal representative of the magnetic flux in the inductive component to account for a peak magnetization current value in order to control the switch; and wherein the switch is a FET having a voltage at the source of the FET (Vsource), and the FET has associated with it, a desired voltage at the source of the FET (Vsource, setpoint) and wherein the controller is further configured to:
record the value of the signal representative of the magnetic flux in the inductive component when the FET is switched off as a first value;
record the value of the signal representative of the magnetic flux in the inductive component at a start of a secondary stroke at which time magnetic energy starts to flow to an output as a second value;
use the first value and the second value to determine a ratio between the values of the signal representative of the magnetic flux in the inductive component when the FET is switched off and at the start of the secondary stroke; and
use the determined ratio to adjust the Vsource or Vsource, setpoint in order to account for the peak magnetization current when controlling the FET.

2. The switching circuit of claim 1, wherein the controller is configured to multiply the value of Vsource, setpoint by the first value divided by the second value to provide a corrected Vsource, setpoint signal, and compare the corrected Vsource, setpoint signal with Vsource in order to identify when the switch is to be operated.

3. The switching circuit of claim 1, wherein the controller is configured to multiply a value of Vsource when the FET is switched off by the second value divided by the first value to determine the peak magnetization current.

4. A switching circuit comprising:
an inductive component including at least one winding;
a switch configured to transfer power from a voltage source to the inductive component in accordance with a switch control signal; and
a controller, configured to:
integrate the voltage across the inductive component in order to generate a signal representative of magnetic flux in the inductive component; and
use the signal representative of the magnetic flux in the inductive component to account for a peak magnetization current value in order to control the switch; The wherein the controller is further configured to:
multiply the signal representative of the magnetic flux in the inductive component by a scaling factor in order to provide a modified signal representative of magnetic flux in the inductive component; and
adjust the scaling factor such that the value of the modified signal representative of the magnetic flux in the inductive component tends towards the value of the current through the switch during a primary stroke; and
determine the peak magnetization current value by measuring the modified signal representative of the magnetic flux in the inductive component at the start of a secondary stroke of the switching circuit; and
wherein the controller comprises an integrator configured to process the modified signal representative of the magnetic flux in the inductive component and a signal representative of the current through the switch in order to adjust the scaling factor.

5. The switching circuit of claim 4, wherein the controller further comprises at least one switch configured to disconnect the modified signal representative of the magnetic flux in the inductive component and/or the signal representative of the current through the switch from the integrator such that the scaling factor is only updated in accordance with signals that are obtained during the primary stroke.

6. The switching circuit of claim 4, wherein the controller comprises:
a comparator configured to compare the signal representative of magnetic flux in the inductive component with the current through the switch during the primary stroke; and
an up/down counter that is configured to increase or decrease the scaling factor in accordance with an output of the comparator.

* * * * *